United States Patent
Rueger (10) Patent No.: US 11,214,488 B2
(45) Date of Patent: Jan. 4, 2022

(54) SYNTHESIS GAS PRODUCTION FROM $CO_2$ AND $H_2O$ IN A CO-ELECTROLYSIS

(71) Applicant: SunFire GmbH, Dresden (DE)

(72) Inventor: Dietmar Rueger, Bannewitz (DE)

(73) Assignee: SunFire GmbH, Dresden (DE)

( * ) Notice: Subject to any disclaimer, the term of this patent is extended or adjusted under 35 U.S.C. 154(b) by 179 days.

(21) Appl. No.: 16/616,568

(22) PCT Filed: Jun. 11, 2018

(86) PCT No.: PCT/DE2018/100554
§ 371 (c)(1),
(2) Date: Nov. 25, 2019

(87) PCT Pub. No.: WO2018/228643
PCT Pub. Date: Dec. 20, 2018

(65) Prior Publication Data
US 2020/0095124 A1    Mar. 26, 2020

(30) Foreign Application Priority Data
Jun. 12, 2017   (EP) ..................... 17175568

(51) Int. Cl.
*C01B 3/38*     (2006.01)
*C10K 3/02*     (2006.01)
*C25B 1/04*     (2021.01)
*C25B 15/08*    (2006.01)

(52) U.S. Cl.
CPC .............. *C01B 3/382* (2013.01); *C10K 3/026* (2013.01); *C25B 1/04* (2013.01); *C25B 15/08* (2013.01); *C01B 2203/0233* (2013.01); *C01B 2203/1205* (2013.01)

(58) Field of Classification Search
CPC ............ C01B 3/382; C01B 2203/0233; C01B 2203/1205; C25B 1/04; C25B 15/08; C25B 9/70; C10K 3/026; C10K 3/04; Y02E 60/36
See application file for complete search history.

(56) References Cited

U.S. PATENT DOCUMENTS

2009/0307975 A1   12/2009   Wolf
2014/0288195 A1    9/2014   Castelli

FOREIGN PATENT DOCUMENTS

EP         2491998 B1    6/2015

OTHER PUBLICATIONS

International Search Report dated Aug. 8, 2018, in International Application No. PCT/DE2018/100554.
Severin R. Foit, et al.: "Power-to-Syngas: An Enabling Technology for the Transition of the Energy System?", Angewandte Chemie International Edition, vol. 56, No. 20, Apr. 21, 2017 (Apr. 21, 2017). pp. 5402-5411, XP055405367, ISSN: 1433-7851, DOI: 10.1002/anie.201607552, the whole document.

*Primary Examiner* — Jafar F Parsa
(74) *Attorney, Agent, or Firm* — Patent Central LLC; Stephan A. Pendorf (57) ABSTRACT

A synthesis gas production process from $CO_2$ and $H_2O$ with a co-electrolysis, wherein the $CO_2$ and $CH_4$ content of the produced gas is reduced on the cathode side.

9 Claims, 7 Drawing Sheets

SYNTHESIS GAS PRODUCTION FROM $CO_2$ AND $H_2O$ IN A CO-ELECTROLYSIS

The invention relates to a synthesis gas production process from $CO_2$ and $H_2O$ with a co-electrolysis, wherein the $CO_2$ and $CH_4$ content of the produced gas on the cathode side should be reduced.

Furthermore, the invention relates to a synthesis gas producing assembly for the production of synthesis gas from $CO_2$ and $H_2O$ with a co-electrolysis and with the corresponding synthesis gas production process with at least one electrolysis stack.

A high-temperature electrolysis cell, namely a solid oxide electrolysis cell, also abbreviated SOEC, for the production of $H_2$ and CO containing gases from $H_2O$ and $CO_2$ by electrolysis (co-electrolysis) operates today at maximum process temperatures of about 850-865° C. Higher process temperatures are currently not possible with a SOEC, especially for material-technical reasons.

For example, for conservation of compressor capability for providing the produced gas under pressure for a subsequent synthesis, co-electrolyses are also being developed for higher process pressures.

The product gas composition is influenced, in addition to the mass ratio of the two feed gas streams $H_2$ and $CO_2$ and the stream density, which affects the steam decomposition degree, substantially also by the temperature- and pressure-dependent chemical balance of the product gas components CO, $CO_2$, $H_2$, $H_2$ and $CH_4$.

The following reactions describe the chemical equilibrium:

$$CO + H_2O \leftrightarrow CO_2 + H_2 \quad \Delta H_R = -41.2 \text{ kJ/mol} \quad (R1)$$

$$CO + 3H_2 \leftrightarrow CH_4 + H_2 \quad \Delta H_R = -206.2 \text{ kJ/mol} \quad (R2)$$

For use in a synthesis of the gas produced in the electrolysis, the lowest possible concentrations of $CO_2$ and $CH_4$ are desired in the synthesis gas, since these gas components usually do not participate in the synthesis reaction and thus lead to a poor C and $H_2$ utilization, a deterioration in efficiency and, ultimately, a reduction in the CO conversion.

Thus, for example, in the Fischer-Tropsch synthesis, an enrichment of $CO_2$ and $CH_4$ can result, in addition to the poorer C and $H_2$ utilization of the synthesis gas, also in an undesirable shift of the product distribution towards lighter products and the formation of undesirable products.

In the methanol synthesis, the enrichment of methane in the synthesis cycle also leads to a poorer C and $H_2$ utilization.

In order to achieve low $CO_2$ and $CH_4$ contents in the synthesis gas, however, high temperatures (R1, R2) and low pressures (R2) are required.

The invention deals with how, despite temperature limitation in co-electrolysis and high process pressures, synthesis gases with lower $CO_2$ and $CH_4$ contents than in the prior art can be produced.

Production of synthesis gas in co-electrolysis is known in the art, but is a relatively new process with few practical applications. Initial considerations have been made by NASA in connection with oxygen production on Mars (G. Tao, K. R. Sridhar, D. L. Chan, Study of carbon dioxide electrolysis at electrode/electrolyte interface: part I. Pt/YSZ interface, Solid State Ionics, 175 (1994), 615-619).

The quality of the gas produced is influenced, besides the $H_2O$ and $CO_2$ decomposition levels of the electrolysis, above all by the chemical equilibrium determined by the temperature and the pressure. An additional influence on the gas quality in the co-electrolysis is not known.

In the publication "Production of Fischer-Tropsch liquid fuels from high temperature solid oxide co-electrolysis unit", W. L. Becker, R. J. Braun, M. Penev, M. Melaina, Energy 47, (2012), 99-115, it is recommended, in order not to let the $CH_4$ content in the synthesis gas for a Fischer-Tropsch synthesis rise too high, to operate the co-electrolysis at a temperature of 800° C. and at a pressure of 1 to 2 bar. Under these conditions, there was achieved an anhydrous synthesis gas having a $H_2$—CO molar ratio of 2.1 $CO_2$-contents of <10 mol % and $CH_4$ contents of <0.5 mole % respectively.

As already stated in the introduction, a high-temperature electrolysis cell, or SOEC (Solid Oxide Electrolysis Cell), is used today to produce $H_2$ and $CO_2$-containing gases from $H_2O$ and $CO_2$ by electrolysis (co-electrolysis) at maximum process temperatures of approx. 850-865° C., since above all the glasses used for sealing the gas chambers, as well as the metals used in the stack do not allow higher process temperatures for material reasons.

The development of the all-ceramic fuel cell/electrolytic cell (I. Wærnhus, A. Vik, C S Ilea, S. Faaland: "Development of an All Ceramic SOFC", ECS Translations, 35 (1), 403-407 (2011)) promises process temperatures up to about 1200° C. However, the production of this fuel cell/electrolytic cell is difficult and in particular very expensive due to the required manufacturing tolerances.

An improvement of the gas quality following the electrolysis is quite possible by using known technologies for gas purification and gas separation.

For the removal of $CO_2$ from synthesis gases according to the state of the art chemical washes, such as MEA, MDEA, etc., physical washing such as pressurized water washes, Rectisol washes, etc., pressure swing process, membrane separation processes, etc. are used.

Membrane processes are also used to remove $CH_4$ from synthesis gas.

It is known from the document EP 2491998 B 1 to use a RWGS process for producing synthesis gas of $CO_2$ and hydrogen. In this process, $CO_2$ and $H_2$ are converted into CO and $H_2O$ using the reverse water-gas-shift reaction (RWGS). In order to achieve low $CO_2$ and $CH_4$ contents in the gas produced, high process temperatures are required.

In M. Boder, R. Dittmeyer: "Catalytic modification of conventional SOFC anodes with a view to reducing their activity for direct internal reforming of natural gas", Journal of Power Sources, Vol. 155, Issue 1, 18 Apr. 2006, p. 13-22, it is proposed to suppress the thermal stresses, efficiency losses and deterioration of the life of the fuel cell in solid oxide fuel cell (SOFC) due to cooling associated with the endothermic, direct internal reforming reaction of methane with steam, by using less active metals, such as copper, covered conventional nickel-containing materials.

Further, document US 2014/0288195 A1 discloses a process for the thermochemical conversion of a carbon-based feedstock to synthesis gas containing predominantly hydrogen $H_2$ and carbon monoxide CO, comprising the following steps, namely a) oxide combustion of the carbonaceous feedstock to generate power-heat-coupling; b) high-temperature electrolysis of water at least starting with the heat generated in step a); and c) reversal of the water-gas shift reaction starting from the carbon dioxide $CO_2$ produced according to step a) and from the hydrogen $H_2$ produced after step b). Further, from the publication "Power to Syngas: An Enabling Technology on Transition of the Energy System?", Applied Chemistry International Edition, vol. 56, no. 20, 21 April 2017 (2017-04-21), pages 5402-5411, XP055405367, ISSN: 1433-7851, DOI: 10.1002/anie.201607552 a synthesis gas production process of $CO_2$ and $H_2O$ with a co-electrolysis is known, wherein the $CO_2$ and $CH_4$ content of the gas produced on the cathode side is reduced, and further still, the use of Ni-containing cathodes, the RWGS reaction occurring on this cathode at high temperatures, as well as the importance of the RWGS reaction for $CO_2$ reduction in the co-electrolysis is disclosed.

A disadvantage of the co-electrolysis known in the prior art is that they are bound to the thermodynamic conditions at the gas outlet from the stack of co-electrolysis, namely in particular pressure and temperature, which determine the gas composition. The result is a relatively high $CO_2$ and $CH_4$ content in the produced synthesis gas, especially at higher process pressures.

In addition, the degree of $H_2O$ and $CO_2$ decomposition in the electrolysis cell must not be too high, since otherwise the oxidic electrolyte is reduced, and resulting in undesirable changes in electrical conductivity and material strength. This leaves a process-related residual content of $CO_2$ and $H_2O$ in the gas, wherein the steam content can be easily separated by condensation in the gas cooling. Typical $H_2O$ or $CO_2$ decomposition levels in SOC electrolyses are about 80%.

Higher $CO_2$ and $CH_4$ contents in the synthesis gas bind carbon and hydrogen, which in the subsequent synthesis does not participate in the chemical reaction and thus can not react to the desired product. The consequences are lower product yields and loss of efficiency.

In a prior art Fischer-Tropsch synthesis on cobalt catalysts, to increase CO conversion and product yield, the reaction residual gas is recirculated by means of a compressor and recycled back to the synthesis reactor. Since $CO_2$ and $CH_4$ do not participate in the Fischer-Tropsch reaction, these gases accumulate in the recycle gas, increase the compaction effort and reduce the partial pressure of the synthesis gas components CO and $H_2$ in the recycle gas, resulting in a reduction in product yield and a change the product composition, namely more light products. In order to avoid an excessive accumulation of $CO_2$ and $CH_4$ in the recycle gas, a portion of the gas, the so-called purge gas, is removed from the circulation. In addition to $CO_2$ and $CH_4$, this discharged gas also contains the synthesis gas components CO and $H_2$ in accordance with the concentration in the gas cycle, which results in a further deterioration of the gas utilization and reduction of the product yield.

In methanol synthesis, the enrichment of methane in the synthesis cycle also leads to a poorer C and $H_2$ utilization, since methane and, according to the gas concentration in the circuit, also carbon monoxide and hydrogen must be removed from the circulation.

In order to subsequently remove $CO_2$ and $CH_4$ from the synthesis gas by means of prior art gas purification and/or separation processes, expensive and complex technologies are required.

In the Sunfire process according to EP 2491998 B1 for the production of synthesis gas from $CO_2$ and water with the aid of electric energy, hydrogen is first produced in a steam electrolysis, which is then used in part to reduce $CO_2$ according to the reverse water gas shift reaction (RWGS reaction) and produce CO.

In contrast to co-electrolysis, in this process, additional hydrogen must be produced in the steam electrolysis in order to bind the oxygen separated off from the $CO_2$ in the subsequent RWGS reactor in the form of water and to bring it out of the process:

$H_2O$ electrolysis: $3\ H_2O \rightarrow 3\ H_2 + 1.5\ O_2$

RWGS reaction: $CO_2 + 3\ H_2 \rightarrow CO + 2\ H_2 + H_2O$

Net reaction: $2\ H_2O + CO_2 \rightarrow CO + 2\ H_2 + 1.5\ O_2$

Co-Electrolysis:

$H_2O$ electrolysis: $2\ H_2O \rightarrow 2\ H_2 + 1\ O_2$ $CO_2$ electrolysis: $CO_2 \rightarrow CO + 0.5\ O_2$ Net reaction: $2\ H_2O + CO_2 \rightarrow CO + 2\ H_2 + 1.5\ O_2$ Furthermore, the hydrogen produced in the steam electrolysis at about 850° C. must be cooled before it can be used in the RWGS reactor, not least to remove the residual steam from the hydrogen which has a negative effect on the synthesis gas quality.

There it is then heated together with the $CO_2$ back to the process temperature. Hydrogen cooling loses heat in the overall process, which negatively impacts the efficiency of the overall process.

In order to reduce the $CO_2$ and $CH_4$ content in the synthesis gas after co-electrolysis, it is proposed for improvement and solution, to heat the 850° C. hot gas after the stack of co-electrolysis with the aid of an electric heater to about 1,000 to 1,100° C. and then pass through a catalyst which favors the reverse water gas shift reaction (RWGS)

$$CO_2 + H_2 \rightarrow CO + H_2O \quad \Delta H_R = +41.2\ kJ/mol \quad (R3)$$

and the steam reforming reaction $$CH_4 + H_2O \rightarrow CO + 3\ H_2 \quad \Delta H_R = +206.7\ kJ/mol \quad (R4).$$

Such a catalyst is, for example, a nickel-containing catalyst, as used for steam reforming plants.

Since these are endothermal reactions, the gas cools down during the reaction on the catalyst. If necessary, further heater-/reactor-stages must be followed until the desired final reaction temperature, preferably or for example 950° C. or higher, is reached which allows a sufficiently low $CO_2$ and $CH_4$ concentration.

Also useful and conceivable are other heater-reactor variants, such as a reactor bed continuously heated with electric energy.

It is also possible that heated gas after the stack is supplied not a catalyst bed but to a coke bed.

The following chemical reactions take place on the coke bed:

$$CO_2 + C \rightarrow 2\ CO \quad \Delta H_R = +172.5\ kJ/mol \quad (R5)$$

$$H_2 + C \rightarrow CO + H_2 \quad \Delta H_R = +132.0\ kJ/mol \quad (R6)$$

$$H_2 + C \rightarrow CH_4 \quad \Delta H_R = -74.9\ kJ/mol \quad (R7)$$

Thus, in addition to steam, especially the unwanted $CO_2$ is converted, which leads to lower $CO_2$ concentrations in the synthesis gas. The exothermic heterogeneous methane formation (R7) is of minor importance here.

The coke is consumed and must be replaced regularly.

A higher end temperature and thus lower $CO_2$ and $CH_4$ content in the gas can also be achieved if the SOEC stack of the prior art with $CO_2/H_2O$ conversions of <80%, is followed by a second, for example all-ceramic stack, suitable for higher process temperatures, wherein the remaining conversions occur at higher temperatures than in the SOEC stack. The SOEC stack of the prior art and the smaller and thus easier to manufacture all-ceramic stack are less expensive than a large all-ceramic stack, which brings economic benefits.

It is further proposed to influence the chemical equilibrium of the reaction (R3), by supplying additional hydrogen to the stack of the electrolysis, in such a way that a higher $CO_2$ conversion is achieved by the excess of hydrogen. It should be noted that the excess of hydrogen also shifts the chemical equilibrium of the reaction (R4) in favor of the formation of methane. The excess hydrogen is separated from the gas by cooling the synthesis gas to the desired $H_2$—CO molar ratio by suitable means and returned to the stack for repeated use.

In order to increase the overall $CO_2/H_2O$ conversion in the electrolysis and thus to achieve lower $CO_2$ contents in the synthesis gas, it is further proposed that hydrogen and carbon monoxide are separated from the gas mixture following the SOEC stack at high temperatures by a suitable separating device, such as a ceramic membrane, and to supply the remaining enriched $H_2O$—$CO_2$ mixture to another SOEC stack to further decompose the $H_2$—$CO_2$ mixture electrolytically. After cooling both gas streams they are mixed again to the finished synthesis gas. Thus, overall higher conversions can be achieved than with a single pass through a stack.

Furthermore, it is proposed to carry out the steam and $CO_2$ electrolysis in separate electrolysis and to mix the product gases hydrogen and carbon monoxide only after the gas cooling in the desired ratio. Thus, methane formation is prevented and the synthesis gas produced is thus methane-free.

Since methane formation increases, especially at higher pressures, it is proposed that materials be used in the stack, or conventional materials be treated by coating with less active materials, in order to avoid the nickel-containing material supported catalytic formation of methane and thus to suppress methane formation.

Synthesis gas production process from $CO_2$ and $H_2O$ with a co-electrolysis (9), wherein the $CO_2$ and $CH_4$ content of the gas produced (18) on the cathode side (17) is reduced, is characterized in that subsequent to the co-electrolysis (9), the gas (18) of the cathode side, containing $H_2$, CO, unreacted steam and $CO_2$ as well as $CH_4$, is additionally supplied to at least one of a catalytic reactor (20, 24) favoring a reverse water-gas shift reaction R3 and/or steam reforming reaction R4 and/or supplied to a coke-filled container (20, 24) favoring at least one of the reactions R5 and/or R6 and/or R7, with:

$$CO_2 + H_2 \rightarrow CO + H_2O \quad \quad R3:$$

$$CH_4 + H_2O \rightarrow CO + 3\,H_2 \quad \quad R4:$$

$$CO_2 + C \rightarrow 2\,CO \quad \quad R5:$$

$$H_2O + C \rightarrow CO + H_2 \quad \quad R6:$$

$$2\,H_2 + C \rightarrow CH_4 \quad \quad R7:$$

wherein, when supplying to the at least one catalytic reactor (20, 24) and/or at least one coke-filled container (20, 24), preheating by means of at least one of electric heater (19, 23) takes place. In a particularly preferred embodiment, after the catalytic reactor(s) and/or the/the filled coke container(s), after cooling of the gas, an at least partial gas separation out of $H_2$ or $H_2$-rich gas from the gas mixture is carried out, wherein the separated and with $H_2$ enriched gas is recycled to the cathode side of the electrolysis stack. This embodiment can also be carried out independently of the catalytic reactor(s) and/or the coke-filled container(s), reference being made by way of example to FIG. 3, namely the variant at 850° C. and corresponding to Table 5.

As a separation device, in a preferred variant, a membrane separation plant and/or a pressure swing absorption plant can be used.

In particular, in one embodiment, the preheating can take place by means of a preheater, wherein this particularly preferably is or can be part of the catalytic reactor.

A preferred embodiment is provided if, after the feed to the at least one of the catalytic reactor (20, 24) favoring the reverse water-gas shift reaction R3 and/or the steam reforming reaction R4 and/or the at least one coke-filled container (20, 24) in which the reactions R5 and/or R6 and/or R7 run, a feeding additionally occurs over an all-ceramic stack, operated at higher temperatures than the first stack, wherein the all-ceramic stack is dimensioned smaller than the first electrolysis stack or a second electrolysis stack, which is operated at the same temperature level as the first electrolysis stack.

Before the feeding of gas to the all-ceramic stack, the gas can be supplied to one or more temperature increases and/or one or more electric heaters. In particular, in this regard temperature increase stages can be used in the form of recuperators, so that the heat generated in the partially necessary gas cooling is used very efficiently to heat the gas to be heated.

The catalytic reactor can be placed under voltage and implemented as a cathode side of a second electrolysis cell stack or full-ceramic stack, the all-ceramic stack is operated at higher temperatures than the stack and the all-ceramic stack is dimensioned smaller than the first electrolysis stack.

Before the feeding of gas to the all-ceramic stack, the second electrolysis stack or a possible means for increasing the temperature and/or an electric heater, the gas can be fed to a gas separation apparatus appropriate for a higher temperature, in particular the temperature level corresponding to the first electrolysis stack, wherein from the gas to be fed to the all-ceramic stack or the temperature increase and/or the electric heater a high fraction, that is in particular up to 100% in the ideal case, but also small amounts, of CO and $H_2$ are separated as gas and provided together with the gas produced from the all-ceramic stack or the second electrolysis stack as synthesis gas for further processing.

In a preferred embodiment, a ceramic membrane is used as the gas separation device.

In a particularly preferred design variant the $CO_2$ and $CH_4$ content of the gas of the cathode side can reduced, for which purpose a separate $CO_2$ and $H_2O$ electrolysis is carried out, whereby $CO_2$ and an optional purge gas is supplied to a first electrolysis stack and steam and an optional purge gas is fed to a second electrolysis stack and both gas streams are combined after the electrolysis to form a synthesis gas.

In particular, a combination of at least two of the feature combinations previously described and listed in the appended claims is particularly interesting. For example, for maintenance, certain efficiently operating reactors or all-ceramic electrolysis cells can be replaced by low-cost coke-filled containers at least temporarily, to allow a longer overall life, wherein in this regard, the investment costs can also be considered.

The present invention synthesis gas production assembly for producing synthesis gas from $CO_2$ and $H_2O$ with a co-electrolysis and with inventive synthesis gas production process includes at least one electrolysis stack and behind the electrolysis stack and at least one of a catalytic reactor favoring a reverse water-gas shift reaction R3 and/or steam reforming reaction R4 and/or a coke-filled container favoring at least one of the reactions R5 and/or R6 and/or R7, wherein at least one temperature increase assembly or recuperator and/or an electric heater is provided before the electrolysis stacks and/or before or in the catalytic reactor and/or coke-filled containers.

Further possible or preferred embodiments and variations are given below:

The present invention synthesis gas production assembly can further to comprise:

- an all-ceramic stack, wherein the all-ceramic stack is made smaller than the first electrolysis stack and/or

- a gas separation apparatus, which is suitable for high temperatures, for the separation of $H_2O$ and $CO_2$ from the gas after the first electrolysis and a second electrolysis stack for further conversion of the separated $H_2$—$CO_2$ mixture and/or

- a second electrolysis stack, wherein a separate $CO_2$ and $H_2O$ electrolysis is carried out, wherein $CO_2$ and an optional purge gas is fed to the first electrolysis stack and steam and an optional purge gas is fed to the second electrolysis stack and both product gas streams, after gas cooling if provided, are combined to form a synthesis gas.

Before the electrolysis cell stack(s) and/or before or the catalytic reactor(s) and/or coke filled container there is provided at least one temperature increasing means or recuperator and/or an electric heater.

It should be noted at this point that the electrical energy used for heating and for the operation of the electrolysis and the like in the course of this disclosure and invention, in particular or exclusively consists of regeneratively produced and particularly preferably excess electric energy. In this regard, reference is made to the other applications and patents of the assignee Sunfire GmbH.

Overall, the advantages of the invention disclosed herein can be summarized as follows:

- improved synthesis gas composition, less unreacted gas components such as $CO_2$ and $CH_4$;
- better carbon utilization, more carbon is converted to CO and less to $CO_2$ and $CH_4$;
- better hydrogen utilization, less hydrogen is bound to methane;
- elimination of complex gas purification processes;
- greater efficiency of gas production, less "ballast gas" is heated, compressed, cleaned;
- higher product yield in the synthesis.

In particular, the following considerations were made by the inventors, which led to corresponding findings and which in turn ultimately led to the invention:

- balance sheet calculations have shown that at 850° C. gas outlet temperature from the co-electrolysis, the gas has high levels of $CO_2$ and $C_4$,
- the $CH_4$ content is increased at high pressures in the co-electrolysis;
- own knowledge and the experience of the development of the RWGS process have shown that lower $CO_2$ and $CH_4$ contents in are possible higher temperatures;
- in order to obtain lower $CO_2$ and $CH_4$ contents in co-electrolysis, new approaches had to be taken, which made it necessary to bring both technologies together;
- considerations to improve gas quality in co-electrolysis.

Further advantages, features and applications of the present invention will become apparent from the following description taken in conjunction with the figures. With reference to the figures, the invention will be explained in more detail and by way of example and preferences.

Figure 1:
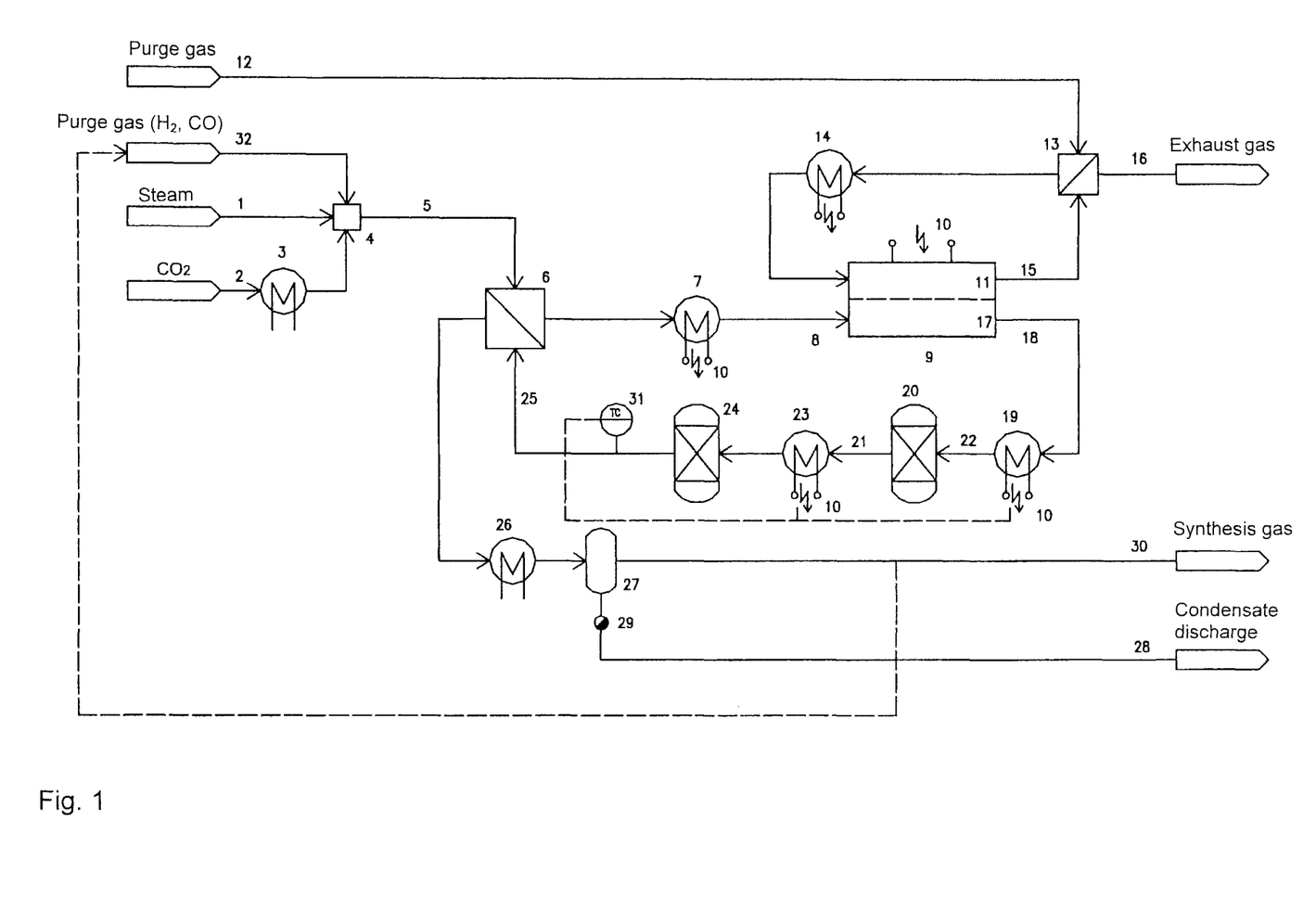
FIG. 1 a schematic representation of an embodiment for increasing the temperature and for downstream provision of catalyst beds for carrying out the RWGS reaction after the electrolysis stack FIG. 2 a schematic representation of an embodiment for increasing the temperature and connecting a small all-ceramic stack.

There is shown in:

FIG. 1 shows a schematic representation of the temperature increase and subsequent connection of catalyst beds for carrying out the RWGS reaction after the electrolysis stack.

Steam 1, $H_2$/CO-containing cathode purge gas 32 and $CO_2$ 2, which is preheated in a heat exchanger 3 to prevent steam condensation, are mixed in a gas mixer 4. The preheating of the $CO_2$ can be done with an electric heater, with waste heat of co-electrolysis or from another external heat source. Steam 1, cathode purge gas 32, and $CO_2$ 2 are under increased pressure to allow synthesis gas 30 to be discharged at a desired pressure. The cathode purge gas 32 may be a partial flow of the synthesis gas 30 recirculated by means of a blower (not shown).

The steam-$CO_2$-purge gas mixture 5 is heated to the extent possible in the recuperator 6 against the hot reaction gas 25 to be cooled and can then, if necessary, be further heated in the electric heater 7.

In the electrolysis stack 9, an electrolytic splitting of steam and $CO_2$ of the supplied gas 8 to $H_2$, CO and $O_2$ is carried out by electric energy 10. The oxygen accumulating at the anode 11 is removed from the stack 9 with purge gas 12, which is supplied at the required pressure and preheated in the recuperator 13 as well as in the electric heater 14. The hot purge gas $O_2$ mixture 15 is cooled in the recuperator 13 against the purge gas 12 to be preheated and then discharged as exhaust gas 16 to the atmosphere.

The approximately 850° C. hot gas 18 accumulating at the cathode 17 contains $H_2$, CO, unreacted steam and $CO_2$ as well as formed methane and due to the high temperature and the nickel-containing material is largely in chemical equilibrium.

In order to reduce the $CO_2$ and $CH_4$ content in the gas 18, the gas 18 is supplied to the electric energy 10 operated heater 19 for further preheating and subsequently is supplied to the catalytic reactor 20, wherein the reheated gas reacts to chemical equilibrium, mainly through the reactions R3 and R4. Since the reaction final temperature of the gas 21 after the catalytic reactor 20 will be higher than in the gas 18 after the electrolysis stack 9, the $CO_2$ and $CH_4$ content in the gas 21 is lower than in the gas 18.

Since the maximum preheating temperature of the gas 22 is limited due to the materials, one or more heater-reactor combinations 23-24 may be necessary until the required reaction end temperature 31 and thus the desired $CO_2$ and $CH_4$ concentration are achieved in the gas 25.

After cooling of the reaction gas 25 in the recuperator 6 against the steam-$CO_2$-purge gas mixture 5 and with the cooling water operated final cooler 26, steam 28 which is unreacted or is formed by the chemical reaction R3 in the electrolysis stack 9 and condensed by the cooling 6 and 26 is discharged from condensation vessel 27 via the condensate removal 29.

The synthesis gas 30 remaining after the separation vessel 27 having the desired $H_2$:CO molar ratio and the low $CO_2$ and $CH_4$ contents is supplied to the subsequent synthesis.

Figure 6:
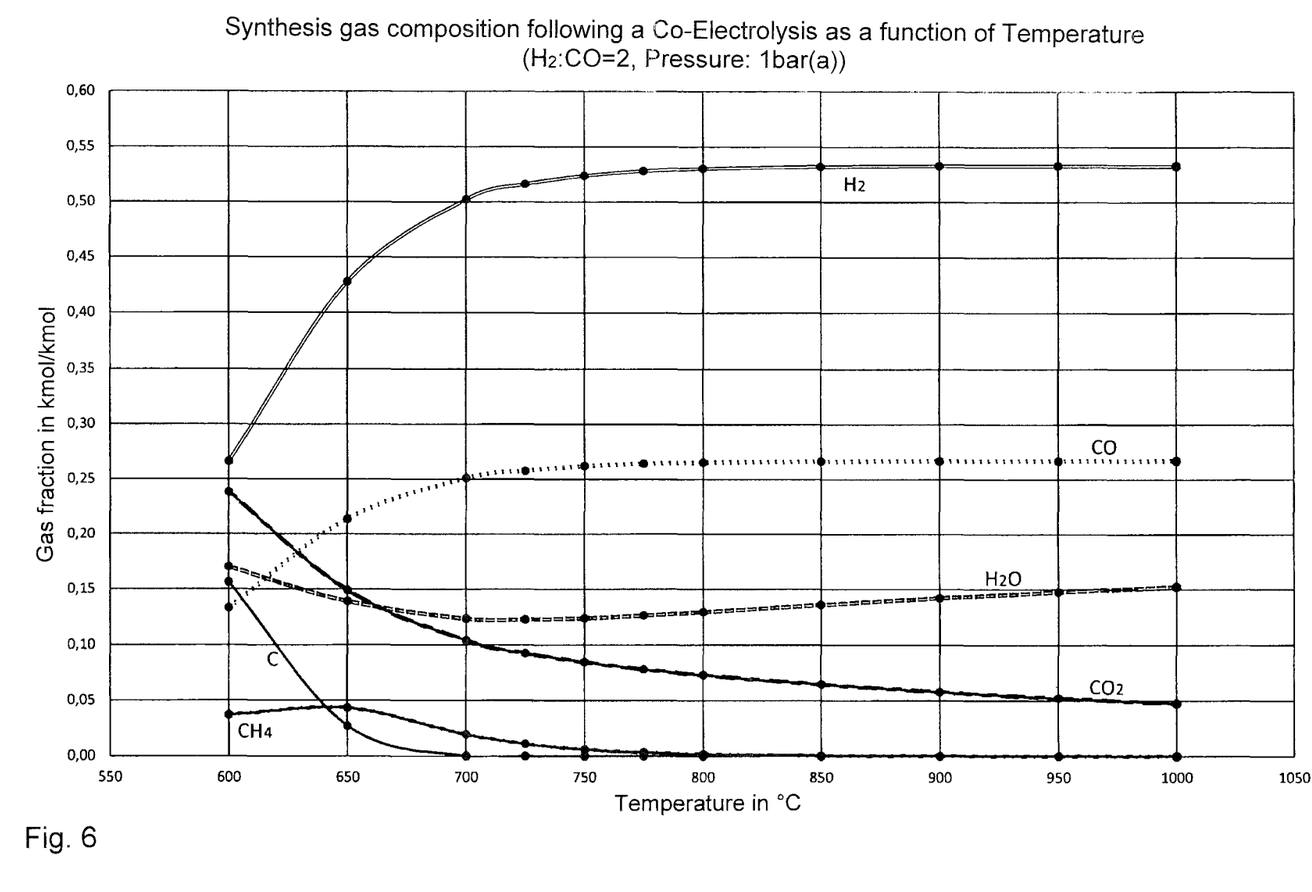
Figure 7:
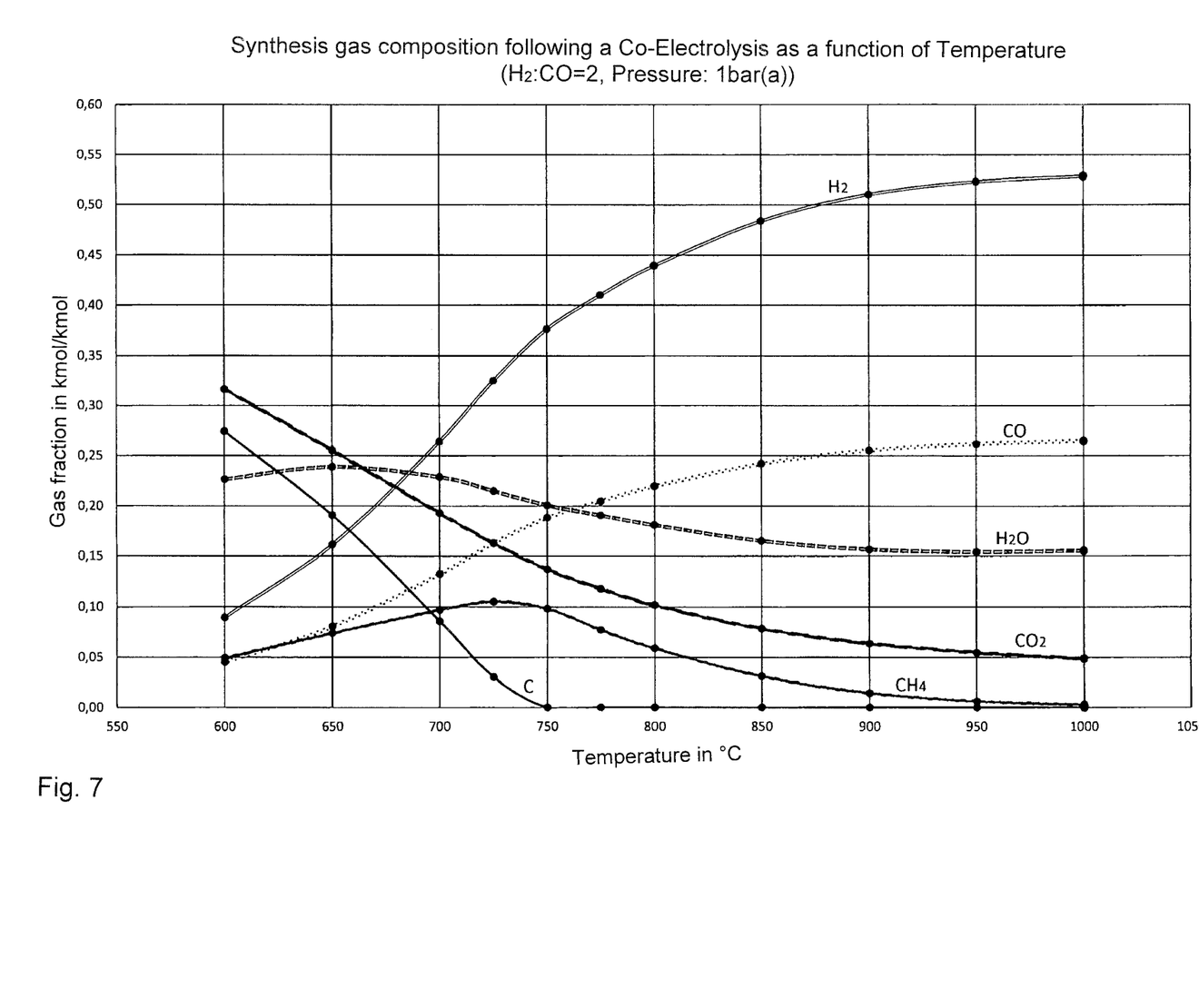

FIGS. 6 and 7 in the appendix show the gas composition following the stack of the co-electrolysis as a function of temperature at a pressure of 1 bar (FIG. 6) and 10 bar (FIG. 7), a $H_2$:CO molar ratio of 2 and a $H_2O/CO_2$ decomposition degree of 80%.

The following tables show the gas compositions for selected temperature values at 1 bar (Table 1) and 10 bar (Table 2) and a $H_2CO_2$ decomposition rate of 80%:

TABLE 1

Gas compositions I for selected temperature values at 1 bar

| | p [bar(a)] | | | | | |
|---|---|---|---|---|---|---|
| | 1 | | | 1 | | |
| | t [° C.] | | | | | |
| | 850 | 950 | 1000 | 850 | 950 | 1000 |
| | kmol/kmol | | | kmol/kmol, anhydrous | | |
| CO | 0.2662 | 0.2666 | 0.2670 | 0.3082 | 0.3128 | 0.3150 |
| $CO_2$ | 0.0647 | 0.0524 | 0.0477 | 0.0749 | 0.0615 | 0.0563 |
| $H_2$ | 0.5325 | 0.5332 | 0.5329 | 0.6163 | 0.6256 | 0.6287 |
| $H_2O$ | 0.1360 | 0.1477 | 0.1523 | 0.0000 | 0.0000 | 0.0000 |
| $CH_4$ | 0.0005 | 0.0001 | 0.0000 | 0.0006 | 0.0001 | 0.0000 |
| Total | 1.0000 | 1.0000 | 1.0000 | 1.0000 | 1.0000 | 1.0000 |
| $H_2$:CO | | | | 2.00 | 2.00 | 2.00 |
| Total $CO_2$ + $CH_4$ | | | | 0.0755 | 0.0616 | 0.0563 |

TABLE 2

Gas compositions I for selected temperature values at 10 bar.

| | p [bar(a)] | | | | | |
|---|---|---|---|---|---|---|
| | 10 | | | 10 | | |
| | t [° C.] | | | | | |
| | 850 | 950 | 1000 | 850 | 950 | 1000 |
| | kmol/kmol | | | kmol/kmol, anhydrous | | |
| CO | 0.2420 | 0.2617 | 0.2647 | 0.2897 | 0.3093 | 0.3134 |
| $CO_2$ | 0.0784 | 0.0546 | 0.0486 | 0.0938 | 0.0646 | 0.0575 |
| $H_2$ | 0.4840 | 0.5233 | 0.5288 | 0.5795 | 0.6187 | 0.6259 |
| $H_2O$ | 0.1648 | 0.1541 | 0.1552 | 0.0000 | 0.0000 | 0.0000 |
| $CH_4$ | 0.0308 | 0.0062 | 0.0027 | 0.0369 | 0.0074 | 0.0032 |
| Total | 1.0000 | 1.0000 | 1.0000 | 1.0000 | 1.0000 | 1.0000 |
| $H_2$:CO | | | | 2.00 | 2.00 | 2.00 |
| Total $CO_2$ + $CH_4$ | | | | 0.1307 | 0.0720 | 0.0607 |

The higher the temperature, the lower the $CO_2$ and $CH_4$ content in the produced gas. The gas compositions at 850° C. correspond to the gas composition in the prior art.

In the following, a further solution, namely by increasing the temperature and providing coke beds downstream of the electrolysis stack, is explained, wherein continued reference may be made to FIG. 1.

In contrast to the previous solution, the reactors 20 and 24 in FIG. 1 are not filled with catalyst but with coke which is consumed by the chemical reactions (R5, R6 and R7) and therefore has to be replaced regularly. The coke can be, e.g., charcoal produced from biomass.

Via the heaters 19 and 23, the gas stream 18 is supplied with that amount of heat that the gas 18 reacts with the coke in the containers 20 and 24 and produces, as a function of the pressure and the gas qualities and reaction end temperatures listed in the following tables (Table 3 and Table 4), respectively at a $H_2H/CO_2$ decomposition degree in the electrolysis of 80%:

TABLE 3

Gas Compositions II for selected temperature values at 1 bar

| | p [bar(a)] | | | | | |
|---|---|---|---|---|---|---|
| | 1 | | | 1 | | |
| | t [° C.] | | | | | |
| | 850 | 950 | 1000 | 850 | 950 | 1000 |
| | kmol/kmol | | | kmol/kmol, anhydrous | | |
| CO | 0.3229 | 0.3296 | 0.3314 | 0.3272 | 0.3310 | 0.3322 |
| $CO_2$ | 0.0063 | 0.0015 | 0.0008 | 0.0064 | 0.0015 | 0.0008 |
| $H_2$ | 0.6455 | 0.6590 | 0.6613 | 0.6541 | 0.6618 | 0.6629 |
| $H_2O$ | 0.0133 | 0.0042 | 0.0025 | 0.0000 | 0.0000 | 0.0000 |
| $CH_4$ | 0.0121 | 0.0057 | 0.0040 | 0.0122 | 0.0057 | 0.0041 |
| Total | 1.0000 | 1.0000 | 1.0000 | 1.0000 | 1.0000 | 1.0000 |
| $H_2$:CO | | | | 2.00 | 2.00 | 2.00 |
| Total $CO_2$ + $CH_4$ | | | | 0.0186 | 0.0072 | 0.0049 |

TABLE 4

Gas Compositions II for selected temperature values at 10 bar

| | p [bar(a)] | | | | | |
|---|---|---|---|---|---|---|
| | 10 | | | 10 | | |
| | t [° C.] | | | | | |
| | 850 | 950 | 1000 | 850 | 950 | 1000 |
| | kmol/kmol | | | kmol/kmol, anhydrous | | |
| CO | 0.2633 | 0.3015 | 0.3115 | 0.2889 | 0.3126 | 0.3187 |
| $CO_2$ | 0.0421 | 0.0126 | 0.0070 | 0.0462 | 0.0130 | 0.0072 |
| $H_2$ | 0.5259 | 0.6027 | 0.6230 | 0.5769 | 0.6249 | 0.6374 |
| $H_2O$ | 0.0884 | 0.0354 | 0.0224 | 0.0000 | 0.0000 | 0.0000 |
| $CH_4$ | 0.0802 | 0.0477 | 0.0360 | 0.0880 | 0.0495 | 0.0368 |
| Total | 1.0000 | 1.0000 | 1.0000 | 1.0000 | 1.0000 | 1.0000 |
| $H_2$:CO | | | | 2.00 | 2.00 | 2.00 |
| Total $CO_2$ + $CH_4$ | | | | 0.1342 | 0.0625 | 0.0440 |

At this point, it is noted that the temperature of 850° C. does not correspond here to the prior art, rather heat was supplied to the gas 18 to reach the reaction end temperature after the coke bed of 850° C.

It is not possible, while maintaining a constant $H_2$:CO molar ratio in the synthesis gas 30 (here=2), to pass the gas 18 after the stack 9 directly, i.e., without further heating, over a coke bed. The endothermic chemical reactions of the gas 18 with the coking carbon (R5 and R6) cool the gas. As the $CO_2$ and the $CH_4$ content increases with decreasing temperature, the gas deteriorates compared to the variant without coke bed (=prior art).

The values in the tables show that an improvement in the gas quality can be achieved by using a coke bed after the electrolysis stack. At higher pressures (10 bar) it is necessary at the same time to use higher temperatures, since the higher methane content again deteriorates the gas quality.

Figure 2:
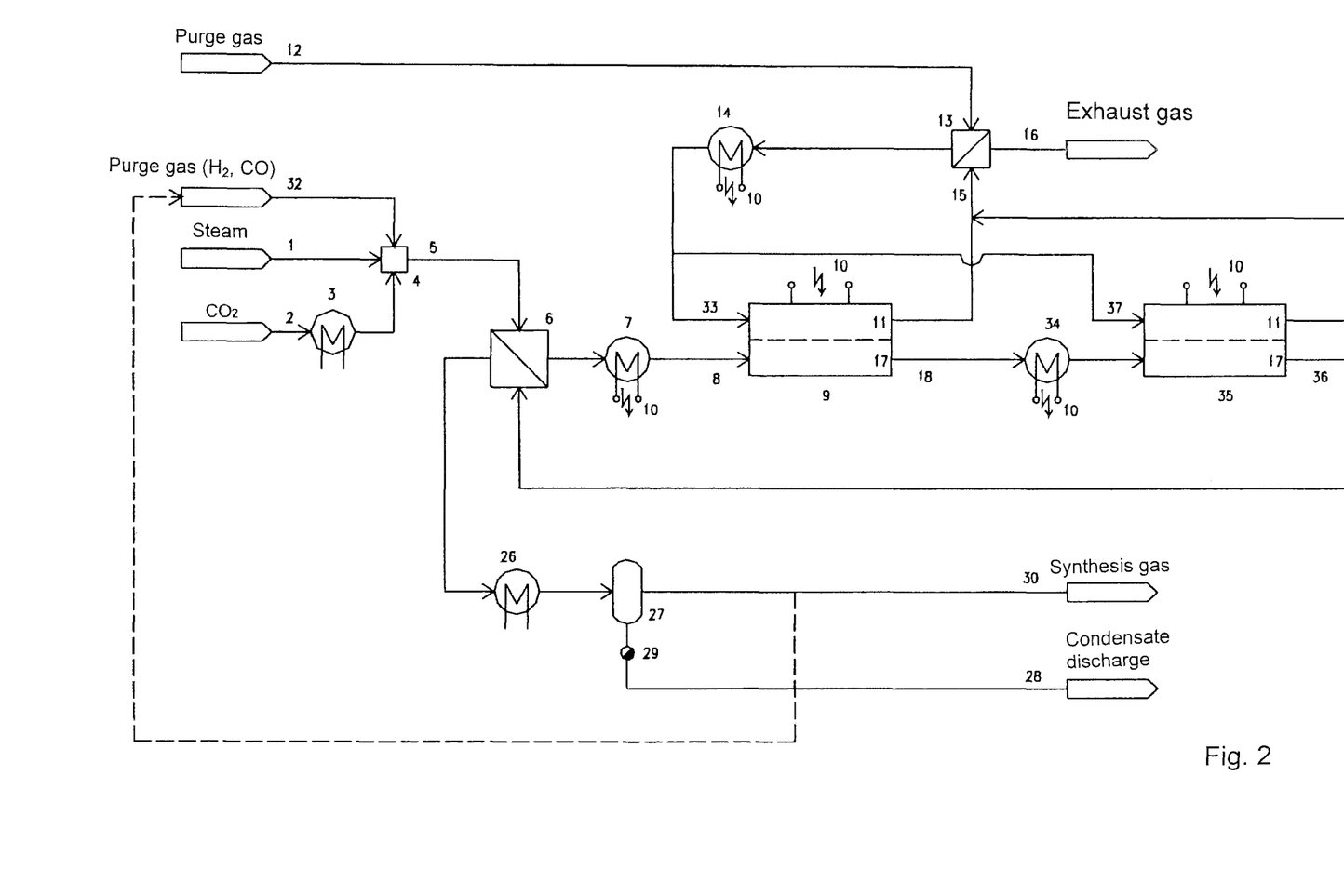

FIG. 2 shows a schematic representation of an embodiment for increasing the temperature and connecting a small all-ceramic stack.

Steam 1, cathode purge gas 32 and $CO_2$ 2, which is preheated in a heat exchanger 3 to avoid steam condensation, are mixed in a mixer 4. The preheating of the $CO_2$ can be done with an electric operated heater, with waste heat of co-electrolysis or from another external heat source. Steam 1, cathode purge gas 32, and $CO_2$ 2 are at increased pressure to allow synthesis gas 30 to be discharged at a desired pressure. The cathode purge gas 32 may be a partial flow of the synthesis gas 30 recirculated by means of a blower (not shown).

The steam-$CO_2$-purge gas mixture 5 is heated to the extent possible in the recuperator 6 against the hot reaction gas 36 to be cooled and then, if necessary, further heated in the electric heater 7.

In electrolysis stack 9, which is operated at usual temperatures of about 850° C., an electrolytic splitting of steam and $CO_2$ of the supplied gas 8 to $H_2$, CO and $O_2$, takes place by electrical energy 10, wherein the $H_2O/CO_2$ degree of conversion has not yet reached its maximum allowable value. The oxygen accumulating at the anode 11 is discharged from the stack 9 using a partial flow 33 of the purge gas 12, which is supplied with the required pressure and preheated in the recuperator 13 and in the electric heater 14.

The 850° C. hot gas 18 forming at the cathode 17 contains $H_2$, CO, unreacted steam and $CO_2$ as well as formed methane and is largely in chemical equilibrium due to the high temperature and the nickel-containing material.

For a further electrolytic $CO_2/H_2O$ decomposition, the gas mixture 18 is further heated in optionally existing heater 34 operated with electric energy 10 and supplied to the all-ceramic stack 35 also powered by electric energy 10, in which the further electrolytic decomposition of $CO_2$ and $H_2O$ takes place up to the permissible $H_2O/CO_2$ degree of decomposition at higher temperatures, for example at 1000° C.

Due to the higher temperatures in the stack 35, the chemical balance of the produced gas mixture 36 is lower in $CO_2$ and $CH_4$ contents than in the co-electrolysis of the prior art.

The oxygen resulting on the anode side 11 of the stack 35 is discharged from the stack 9 with the second partial flow 37 of the purge gas 12 and after mixing with the hot purge gas-$O_2$ mixture from the stack 9 as gas 15 is cooled in the recuperator 13 against the to-be-preheated purge gas 12 and then discharged as exhaust gas 16 to the atmosphere.

After cooling of the reaction gas 36 in the recuperator 6 against the to-be-heated steam-$CO_2$-purge gas mixture 5 and in the cooler 26 operated with cooling water, steam 28 not converted in the electrolysis stack 35 and condensed in the cooling 6 and 26 is separated in the condensation container 27 and discharged via the condensate separator 29.

The synthesis gas 30 remaining after the separation vessel 27 with the desired $H_2$:CO molar ratio and the low $CO_2$ and $CH_4$ contents is supplied to the subsequent synthesis.

The gas compositions which are established at 1,000° C. and in each case at 1 bar and at 10 bar with the same total $H_2O/CO_2$ decomposition rate correspond to the compositions of the variant with downstream catalytic reactors and are shown in the corresponding tables in the description associated with FIG. 1.

Figure 3:
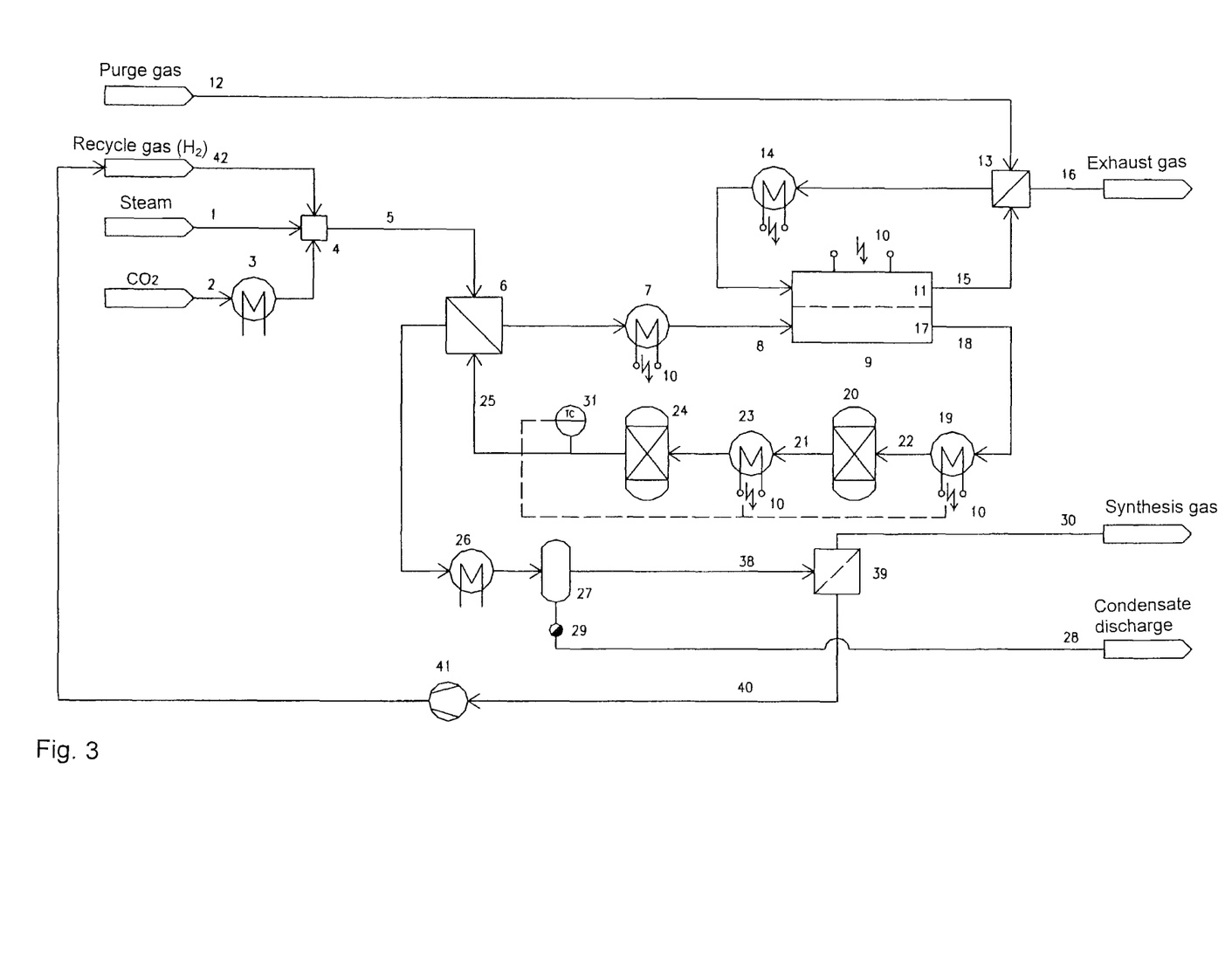
FIG. 3 a schematic representation of an embodiment with $H_2$ excess.

In FIG. 3 is a schematic representation of an embodiment shown with $H_2$ excess.

In contrast to the variant of FIG. 1, hydrogen or a hydrogen-enriched gas 40 is separated from the gas 38 after the final cooling 26 and condensate separation 27 in the device 39, is recirculated by means of the compressor 41, and together with the steam 1 and the $CO_2$ 2 is returned to the process.

The device 39 for hydrogen separation may be, for example, a membrane separation plant or a pressure swing absorption plant (PSA).

For precise control of the amount of $H_2$ to be separated off, for example, part of the gas stream 38 can be guided as a bypass around the separating device 39 (not shown).

The gas 30 remaining after the gas separation unit 39 is the synthesis gas with the desired $H_2$:CO molar ratio for the subsequent synthesis.

The hydrogen 42 supplied to the process assumes at the same time the function of the cathode purge gas 32.

By $H_2$-recirculation, the SOC stack is operated with $H_2$ excess, and there is a shift of the chemical equilibrium of the reactions R3 and R4 to less $CO_2$ and more $CH_4$, as the following table shows ($H_2O/CO_2$ decomposition degree 80%):

TABLE 5

Gas Compositions III for selected temperature values at 1 and 10 bar

| | Pressure | | | | | | | |
|---|---|---|---|---|---|---|---|---|
| | 1 bar | | | | 10 bar | | | |
| | Temperature | | | | | | | |
| | 850° C. | | 950° C. | | 850° C. | | 950° C. | |
| | without | with | without | with | without | with | without | with |
| $H_2$-Loop | | | | kmol/kmol anhydrous | | | | |
| CO | 0.3082 | 0.3205 | 0.3128 | 0.3241 | 0.2897 | 0.2914 | 0.3093 | 0.3165 |
| $CO_2$ | 0.0749 | 0.0366 | 0.0615 | 0.0276 | 0.0938 | 0.0574 | 0.0646 | 0.0325 |
| $H_2$ | 0.6163 | 0.6412 | 0.6256 | 0.6481 | 0.5795 | 0.5812 | 0.6187 | 0.6325 |
| $H_2O$ | 0.0000 | 0.0000 | 0.0000 | 0.0000 | 0.0000 | 0.0000 | 0.0000 | 0.0000 |
| $CH_4$ | 0.0006 | 0.0017 | 0.0001 | 0.0002 | 0.0369 | 0.0701 | 0.0074 | 0.0185 |
| Total | 1.0000 | 1.0000 | 1.0000 | 1.0000 | 1.0000 | 1.0000 | 1.0000 | 1.0000 |
| $H_2$:CO | 2.00 | 2.00 | 2.00 | 2.00 | 2.00 | 1.99 | 2.00 | 2.00 |
| Total $CO_2$ + $CH_4$ | 0.0755 | 0.0383 | 0.0616 | 0.0278 | 0.1307 | 0.1275 | 0.0720 | 0.0510 |

The variant at 850° C. corresponds to a co-electrolysis with $H_2$ excess but without the reheating of the gas 18 from the stack in the heaters 19 and 23 and the post-reaction in the reactors 20 and 24 at higher temperatures.

In each case, the gas qualities with $H_2$ recirculation ("with") are compared with the qualities without recirculation ("without"). The gas qualities without recirculation correspond to the qualities with downstream catalytic reactor.

With $H_2$ excess, an improvement in gas quality over the prior art can be achieved. At higher pressures (10 bar), a higher reaction end temperature is also advantageous for a significant improvement in gas quality.

Figure 4:
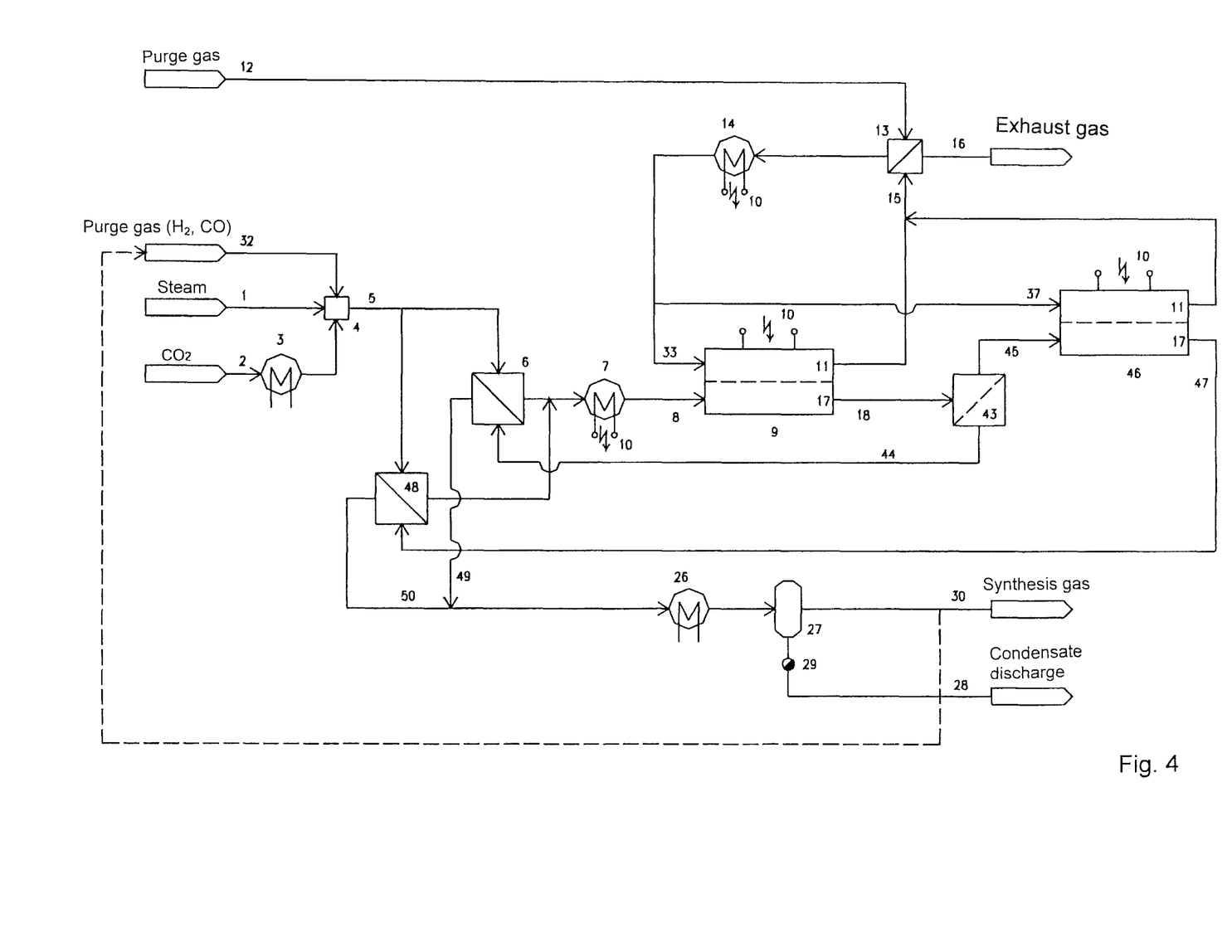
FIG. 4 a schematic representation of an embodiment of a $H_2$/CO separation at high temperatures and downstream provision of a second stack and FIG. 5 a schematic representation of an embodiment for a separate electrolytic decomposition of $H_2$ and $CO_2$.

FIG. 4 shows a schematic representation of an exemplary embodiment of an $H_2/CO$ separation at high temperatures and subsequent connection of a second stack.

The CO and $H_2$-rich gas 47 leaving stack 46 is cooled in the recuperator 48 against the second partial flow of the gas 5. Both cooled gas streams 49 and 50 are mixed and further cooled in the final cooler 26, where the remaining water 28 contained in the gas mixture is condensed out and separated in the condenser 27 from the gas stream.

The synthesis gas 30 having the desired $H_2$:CO molar ratio is fed to the subsequent synthesis.

If, in addition, a higher reaction temperature is to be achieved, heaters and catalytic reactors for example can be connected downstream of the stack 46 as described in FIG. 1.

The gas qualities resulting at temperatures of 850° C. and 950° C. and at a pressure of 1 bar and 10 bar and at a $H_2O/CO_2$ decomposition of 80% in the first and 70% in the second stack are summarized in the following table:

TABLE 6

Gas Compositions IV for selected temperature values at 1 and 10 bar

| | Pressure | | | | | | | |
| --- | --- | --- | --- | --- | --- | --- | --- | --- |
| | 1 bar | | | | 10 bar | | | |
| | Temperature | | | | | | | |
| $H_2$ + CO- | 850° C. | | 950° C. | | 850° C. | | 950° C. | |
| Abtrennung + 2. Co-SOC | without | with | without | with | without | with | without | with |
| | | | | kmol/kmol anhydrous | | | | |
| CO | 0.3082 | 0.3258 | 0.3128 | 0.3275 | 0.2897 | 0.3146 | 0.3093 | 0.3257 |
| $CO_2$ | 0.0749 | 0.0224 | 0.0615 | 0.0176 | 0.0938 | 0.0261 | 0.0646 | 0.0177 |
| $H_2$ | 0.6163 | 0.6515 | 0.6256 | 0.6549 | 0.5795 | 0.6308 | 0.6187 | 0.6522 |
| $H_2O$ | 0.0000 | 0.0000 | 0.0000 | 0.0000 | 0.0000 | 0.0000 | 0.0000 | 0.0000 |
| $CH_4$ | 0.0006 | 0.0003 | 0.0001 | 0.0000 | 0.0369 | 0.0285 | 0.0074 | 0.0043 |
| Total | 1.0000 | 1.0000 | 1.0000 | 1.0000 | 1.0000 | 0.9999 | 1.0000 | 1.0000 |
| $H_2$:CO | 2.00 | 2.00 | 2.00 | 2.00 | 2.00 | 2.01 | 2.00 | 2.00 |
| Total $CO_2$ + $CH_4$ | 0.0755 | 0.0227 | 0.0616 | 0.0176 | 0.1307 | 0.0546 | 0.0720 | 0.0220 |

Starting from the description of FIG. 1, the gas 18 produced in the first stack 9 with a $H_2O$ and $CO_2$ decomposition degree of, for example, 80% is first fed to a gas separation device 43, which is suitable for high temperatures. This gas separation device 43 may be, for example, a ceramic membrane.

With the help of this gas separation device, a high proportion of CO and $H_2$ and possibly no $H_2O$ and $CO_2$ is separated as gas 44 from the gas 18 and then cooled in the recuperator 6 against a partial flow of the gas mixture 5.

The remaining amount 45 of $H_2O$ and $CO_2$ is supplied as a feed gas to a second stack 46, in which the gas 45 is further decomposed electrolytically using electric energy 10. Since the $H_2$ and CO content in the gas 45 is initially low, a high degree of decomposition, e.g., 70%, in relation to the amount of $H_2O$ and $CO_2$ supplied in the gas 45, can again be achieved in the stack 46, so that the total $H_2/CO_2$ degree of decomposition based on the amount of steam 1 and $CO_{22}$ in both stacks is much higher than in only one stack (e.g. 80%), without the risk that the oxidic electrolyte of the stack is reduced.

In each case, the gas qualities with 2nd co-electrolysis ("with") are compared with the qualities without second co-electrolysis ("without"). The gas qualities without 2nd co-electrolysis correspond to the qualities with downstream catalytic reactor.

With a second co-electrolysis and thus higher $H_2O/CO_2$ decomposition degree, an improvement in gas quality over the prior art can be achieved.

Figure 5:
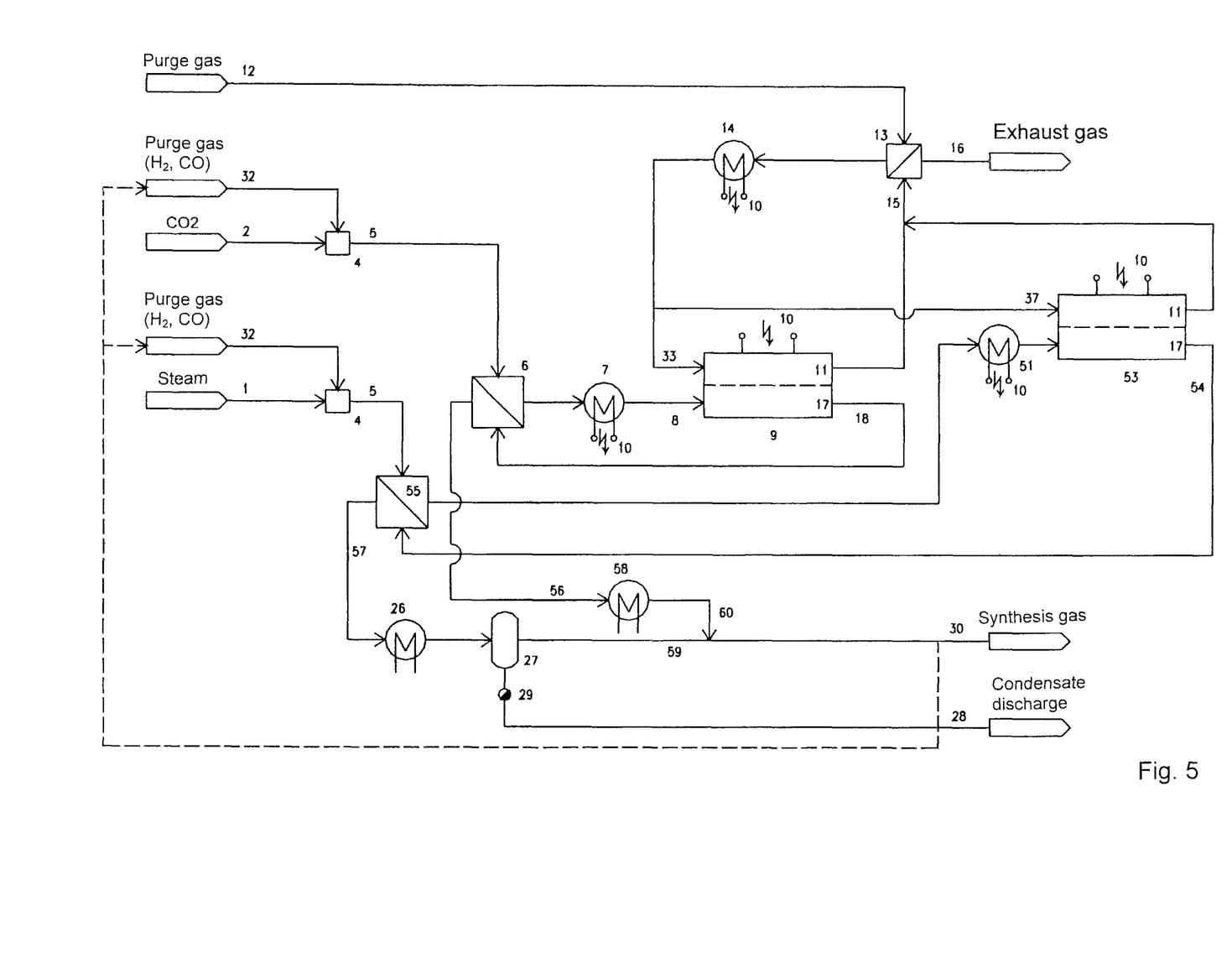

In FIG. 5 is a schematic representation of an embodiment for a separate electrolytic decomposition of $H_2O$ and $CO_2$ is shown in which a separate $CO_2$ and $H_2O$ electrolysis is applied.

The $CO_2$ 2 is decomposed catalytically by means of electric energy 10 after recuperative heating in the heat exchanger 6 against the hot CO-rich gas 18 and further heating in the heater 7 in the stack 9.

The steam 1 is decomposed electrolytically after recuperative heating in the heat exchanger 55 against the hot $H_2$-rich gas 54 and further heating in the heater 51 in the stack 53 by means of electric energy 10.

After the final cooling of the two cooled gas streams 56 and 57 in the coolers 26 and 58, and the separation of the condensate 28 from the gas stream 59 in the condenser 27, both streams 59 and 60 are mixed to synthesis gas 30 with the desired $H_2$:CO molar ratio and supplied to the subsequent synthesis.

The following table (Table 6) shows the gas compositions at 850° C. and 950° C. and a pressure of 1 bar and 10 bar each at a $H_2O/CO_2$ decomposition degree of 80%:

TABLE 6

Gas compositions V for selected temperature values at 1 and 10 bar

| | Pressure | | | | | | | |
|---|---|---|---|---|---|---|---|---|
| | 1 bar | | | | 10 bar | | | |
| | Temperature | | | | | | | |
| $H_2$ + CO- | 850° C. | | 950° C. | | 850° C. | | 950° C. | |
| separate $CO_2$- and $H_2O$-SOC | without | with | without | with | without | with | without | with |
| | | | kmol/kmol anhydrous | | | | | |
| CO | 0.3082 | 0.3077 | 0.3128 | 0.3077 | 0.2897 | 0.3077 | 0.3093 | 0.3077 |
| $CO_2$ | 0.0749 | 0.0770 | 0.0615 | 0.0770 | 0.0938 | 0.0770 | 0.646 | 0.0770 |
| $H_2$ | 0.6163 | 0.6153 | 0.6256 | 0.6153 | 0.5795 | 0.6153 | 0.6187 | 0.6153 |
| $H_2O$ | 0.0000 | 0.0000 | 0.0000 | 0.0000 | 0.0000 | 0.0000 | 0.0000 | 0.0000 |
| $CH_4$ | 0.0006 | 0.0000 | 0.0001 | 0.0000 | 0.0369 | 0.0000 | 0.0074 | 0.0000 |
| Total | 1.0000 | 1.0000 | 1.0000 | 1.0000 | 1.0000 | 1.0000 | 1.0000 | 1.0000 |
| $H_2$:CO | 2.00 | 2.00 | 2.00 | 2.00 | 2.00 | 2.00 | 2.00 | 2.00 |
| Total $CO_2$ + $CH_4$ | 0.0755 | 0.0770 | 0.0616 | 0.0770 | 0.1307 | 0.0770 | 0.0720 | 0.0770 |

In this variant, the gas quality is determined solely by the $H_2O$ or $CO_2$ decomposition degree. A temperature and pressure dependence of the gas composition is not present, since no homogeneous gas reactions (R3 and R4) can proceed. This leads to lower $CO_2$+$CH_4$ contents being achieved in comparison to the prior art with comparable $H_2O$ and $CO_2$ decomposition levels in the electrolysis only at high pressures and temperatures <950° C. The cause is the lack of methane formation.

LIST OF REFERENCE NUMBERS

| | |
|---|---|
| 1 | steam |
| 2 | carbon dioxide |
| 3 | heat exchanger |
| 4 | gas mixer |
| 5 | steam-$CO_2$-purge gas-mixture |
| 6 | recuperator |
| 7 | electric heater |
| 8 | feedgas stack |
| 9 | electrolysis stack |
| 10 | electric energy |
| 11 | anode of stack |
| 12 | purge gas |
| 13 | recuperator |
| 14 | electric heater |
| 15 | purge gas-$O_2$-mixture |
| 16 | exhaust gas |
| 17 | cathode of the stack |
| 18 | gas after stack |
| 19 | electric heater |
| 20 | catalytic reactor or coke filled container |
| 21 | reaction gas after catalytic reactor or coke filled container |
| 22 | preheated gas |
| 23 | electric heater |
| 24 | catalytic reactor or coke filled container |
| 25 | reaction gas |
| 26 | final cooler |
| 27 | condensate separator |
| 28 | condensate |
| 29 | condensate separator |
| 30 | synthesis gas |
| 31 | reaction end temperature |

-continued

LIST OF REFERENCE NUMBERS

| | |
|---|---|
| 32 | cathode purge gas |
| 33 | partial flow of purge gas 12 |

-continued

LIST OF REFERENCE NUMBERS

| | |
|---|---|
| 34 | electric heater |
| 35 | all-ceramic electrolysis stack |
| 36 | gas after all-ceramic stack |
| 37 | partial flow of purge gas 12 |
| 38 | gas after final cooling |
| 39 | device for the separation of $H_2$ from the gas mixture 38 |
| 40 | $H_2$ enriched gas |
| 41 | recirculation compressor |
| 42 | supplied, recirculated $H_2$ stream |
| 43 | gas separator, suitable for high temperatures |
| 44 | $H_2$- and CO-enriched gas |
| 45 | $H_2O$ and $CO_2$ enriched gas |
| 46 | electrolysis stack |
| 47 | gas after stack 46 |
| 48 | recuperator |
| 49 | partial stream of cooled reaction gas |
| 50 | partial flow cooled reaction gas |
| 51 | electric heaters |
| 52 | steam in front of stack 53 |
| 53 | electrolysis stack |
| 54 | $H_2$ rich gas following stack 53 |
| 55 | recuperator |
| 56 | cooled partial flow CO |
| 57 | cooled partial flow $H_2$ |
| 58 | final cooler |
| 59 | $H_2$ stream after condensate separation |
| 60 | CO stream to final cooler |

The invention claimed is:

1. A synthesis gas production process from $CO_2$ and $H_2O$ with a co-electrolysis (9), wherein the $CO_2$ and $CH_4$ content of the produced gas (18) on the cathode side (17) is reduced, wherein for this purpose, subsequent to the co-electrolysis (9), the gas (18) of the cathode side, containing $H_2$, CO, unreacted steam and $CO_2$ as well as $CH_4$, is additionally fed to a catalytic reactor (20, 24) favoring a reverse water-gas shift reaction R3 and/or steam reforming reaction R4 and/or fed to a coke-filled container (20, 24) favoring at least one of the reactions R5, R6 and R7, with:

$$CO_2 + H_2 \rightarrow CO + H_2O \qquad R3:$$

$$CH_4 + H_2O \rightarrow CO + 3H_2 \qquad R4:$$

$$CO_2 + C \rightarrow 2\,CO \qquad R5:$$

$$H_2O + C \rightarrow CO + H_2 \qquad R6:$$

$$2H_2 + C \rightarrow CH_4 \qquad R7:$$

wherein, while feeding to the at least one catalytic reactor (20, 24) and/or at least one coke-filled container (20, 24), preheating by means of at least one electric heater (19, 23) takes place.

2. The synthesis gas production process according to claim 1, wherein after the catalytic reactor(s) and/or the coke-filled container(s) (20, 24), a partial gas separation of $H_2$ or $H_2$-rich gas from the gas mixture takes place after cooling (6, 26) of the gas (25), wherein the gas (40) separated and enriched with Hz is recycled to the cathode side (17) of the electrolysis stack (9).

3. The synthesis gas production process according to claim 2, wherein as a separation device (39) a membrane separation plant and/or a pressure swing absorption plant is used.

4. The synthesis gas production process according to claim 1, wherein the preheating takes place by means of a preheater (19, 23), which is a component of the catalytic reactor(s) (20, 24).

5. The synthesis gas production process according to claim 1, wherein, after feeding to
 (i) the at least one catalytic reactor (20, 24) favoring at least one of a reverse water-gas shift reaction R3 and a steam reforming reaction R4
 and/or
 (ii) the at least the one coke-filled container (20, 24) favoring at least one of the reactions R5, R6 and R7
take place, a feeding additionally takes place to
 an all-ceramic stack (35) operated at temperatures higher than the stack (9), wherein the all-ceramic stack (35) is dimensioned smaller than the first electrolysis stack (9)
 or
 a second electrolysis stack (46), operated at the same temperature level as the first electrolysis stack (9).

6. The synthesis gas production process according to claim 5, wherein prior to the feeding of the gas (18) to the all-ceramic stack (35), the second electrolysis stack (46) or any temperature increase and/or an electric heater (34), the gas (18) is fed to a gas separation device (43) suitable for higher temperatures, wherein from the all-ceramic stack (35), the second electrolysis stack (46) or the gas (18) to be fed to temperature increase and/or the electric heater (34) a proportion of CO and $H_2$ from more than 0% to up to 100% is separated as gas (44, 49) and is made available as synthesis gas (30) together with the gas (47, 50) produced from the all-ceramic stack (46) or the second electrolysis stack (46) for further processing.

7. The synthesis gas production process according to claim 6, wherein a ceramic membrane is used as gas separation device (43).

8. A synthesis gas production process from $CO_2$ and $H_2O$ with a co-electrolysis in at least one electrolysis stack (9), wherein the $CO_2$ and $CH_4$ content of the produced gas (18) on the cathode side (17) is reduced, wherein for this purpose, subsequent to the co-electrolysis (9), the gas (18) of the cathode side, containing $H_2$, CO, unreacted steam and $CO_2$ as well as $CH_4$, is additionally fed to a catalytic reactor (20, 24) favoring a reverse water-gas shift reaction R3 and a steam reforming reaction R4 and/or fed to a coke-filled container (20, 24) favoring at least one of the reactions R5, R6 and R7, with:

$$CO_2 + H_2 \rightarrow CO + H_2O \qquad R3:$$

$$CH_4 + H_2O \rightarrow CO + 3H_2 \qquad R4:$$

$$CO_2 + C \rightarrow 2CO \qquad R5:$$

$$H_2O + C \rightarrow CO + H_2 \qquad R6:$$

$$2H_2 + C \rightarrow CH_4 \qquad R7:$$

wherein, while feeding to the at least one catalytic reactor (20, 24) and/or at least one coke-filled container (20, 24), preheating by means of at least one electric heater (19, 23) takes place.

9. The synthesis gas production process according to claim 8, wherein upstream of the electrolysis stack (9) and/or upstream of or in the catalytic reactor (20, 24) and/or the coke-filled container (20, 24) a recuperator or an additional temperature increasing means is provided in addition to the electric heater (19, 23).

* * * * *